US006513042B1

(12) United States Patent
Anderson et al.

(10) Patent No.: US 6,513,042 B1
(45) Date of Patent: Jan. 28, 2003

(54) INTERNET TEST-MAKING METHOD

(75) Inventors: John C. Anderson, Cleveland, OH (US); Charles Stack, Cleveland Heights, OH (US)

(73) Assignee: Test.com, Cleveland, OH (US)

( * ) Notice: Subject to any disclaimer, the term of this patent is extended or adjusted under 35 U.S.C. 154(b) by 0 days.

(21) Appl. No.: 09/248,465

(22) Filed: Feb. 11, 1999

(51) Int. Cl.[7] .............................................. G06F 17/30
(52) U.S. Cl. ............................ 707/102; 707/1; 707/10; 434/322; 434/327; 434/335; 434/350; 434/362; 705/40; 705/400
(58) Field of Search ............................ 707/10, 102, 1; 434/322, 327, 335, 350, 362; 705/40, 14, 400

(56) References Cited

U.S. PATENT DOCUMENTS

| | | | |
|---|---|---|---|
| 5,170,362 A | * 12/1992 | Greenberg et al. | 700/90 |
| 5,664,115 A | 9/1997 | Fraser | 705/37 |
| 5,706,502 A | 1/1998 | Foley et al. | 707/10 |
| 5,827,070 A | * 10/1998 | Kershaw et al. | 434/322 |
| 5,862,223 A | * 1/1999 | Walke et al. | 705/1 |
| 5,907,831 A | * 5/1999 | Lotvin et al. | 434/322 |
| 5,930,777 A | * 7/1999 | Barber | 705/40 |
| 5,947,747 A | * 9/1999 | Walker et al. | 380/251 |
| 5,974,446 A | * 10/1999 | Sonnenreich et al. | 709/204 |
| 6,009,412 A | * 12/1999 | Storey | 705/14 |
| 6,112,049 A | * 8/2000 | Sonnefeld | 434/350 |
| 6,157,926 A | * 12/2000 | Appleman et al. | 707/102 |

OTHER PUBLICATIONS

Koltum et al, Progress Report on The Study of Program Reading, Dept. of Computer Science North Carolina State University, ACM 1983, pp. 168–176.*

"Test and Test Banks", SmarTest™ Test Help Systems, 6 pages.

Jan. 27, 1999 letter from SmarTest Company, Inc. regarding brochure.

* cited by examiner

Primary Examiner—Greta Robinson
Assistant Examiner—Debbie M Le
(74) Attorney, Agent, or Firm—Renner, Otto, Boisselle & Sklar, LLP

(57) ABSTRACT

A method of making a tests, assessments, surveys and lesson plans with images and sound files and posting them on-line for potential users. Questions are input by a test-maker and then the questions are compiled into a test by a host system and posted on-line for potential test-takers. The compiled test may be placed in a directory for access by the test-takers, the directory preferably having a plurality of categories corresponding to different types of tests and the compiled test is placed in the appropriate category. For ease in administration, a just-made test is placed into a temporary category so that it may be later reviewed (by the proprietor of the host system) and placed in the most appropriate category.

16 Claims, 25 Drawing Sheets

| Quiz Name: | |
|---|---|
| Header: | |
| Footer: | |

[Add] [Reset]

Fig.5A

| Quiz Name: | How Many Apples in the Basket? |
|---|---|
| Header: | This is a test to determine how many apples are left in the basket. |
| Footer: | If you scored 35, perfect!<br>If you scored more than 20, still pretty good!<br>If you scored 20 or less, not bad.<br>If you scored 15 or less, need improvement.<br>If you scored less than 15, get help, fast. |

[Add] [Reset]

Fig.5B

| Quiz Num: | 13337 |
|---|---|
| Quiz Name: | How Many Apples in the Basket? |
| Enable: | No ▽ |
| Header: | This is a test to determine how many apples are left in the basket. |
| Footer: | If you scored 35, perfect!<br>If you scored more than 20, still pretty good!<br>If you scored 20 or less, not bad.<br>If you scored 15 or less, need improvement.<br>If you scored less than 15, get help, fast. |

[ Update Test ]  [ reset ]

[ Test Options ]

Click here to add a question, or click the question nwnber to edit an existing question.

| Question # | Type | Question Statement |
|---|---|---|

Fig. 5C

| new question | test number:13337 | |
|---|---|---|
| question type: | multiple choice ▽ | |
| question: | | |

| | Letter | Answer |
|---|---|---|
| Answer Choices (if the question type is multiple choice or multiple answer.) | A | |
| | B | |
| | C | |
| | D | |
| | E | |

| | Answer | Value |
|---|---|---|
| Correct Answer(s) (if this is a multiple choice or multiple answer question, enter the correct letter for the answer.) | | 1 |
| | | 1 |
| | | 1 |
| | | 1 |
| | | 1 |

| expanation: | |
|---|---|

[update] [reset]

Fig.5D

| | |
|---|---|
| new question | test number:13337 |
| question type: | multiple choice [▽] |
| question: | Five apples are in a basket. One more apple drops into the basket and two apples fall out. How many apples are left in the basket? |
| Answer Choices (if the question type is multiple choice or multiple answer.) | Letter      Answer <br> A    6 <br> B    5 <br> C    4 <br> D    3 <br> E    2 |
| Correct Answer(s) (if this is a multiple choice or multiple answer question, enter the correct letter for the answer.) | Answer      Value <br> C      15 <br> B      5 <br> D      5 <br> A      1 <br> E      1 |
| expanation: | Five (5) apples are in the basket.     5 apples <br> One (1) apple drops into the basket.   5+1=6 apples <br> Two (2) apples fall out.               6−2=4 apples |

[ update ] [ reset ]

Fig.5E

| Quiz Num: | 13337 |
|---|---|
| Quiz Name: | How Many Apples in the Basket? |
| Enable: | No ▽ |
| Header: | This is a test to determine how many apples are left in the basket. |
| Footer: | If you scored 35, perfect!<br>If you scored more than 20, still pretty good!<br>If you scored 20 or less, not bad.<br>If you scored 15 or less, need improvement.<br>If you scored less than 15, get help, fast. |

[ Update Test ]  [ reset ]

[ Test Options ]

Click here to add a question, or click the question number to edit an existing question.

| Question# | Type | Question Statement | |
|---|---|---|---|
| 1 | Multiple Choice | Five apples are in a basket. One more apple drops into the basket and two apples fall out. How many apples are left in the basket? | Add<br>After |

Fig.5F

| new question | test number:13337 |
|---|---|
| question type: | multiple choice ▽ |
| question: | If five apples are in a basket and one more apple drops into the basket and two apples fall out, are there five apples left in the basket? |

| Answer Choices (if the question type is multiple choice or multiple answer.) | Letter | Answer | | |
|---|---|---|---|---|
| | A | True | | |
| | B | False | | |
| | C | | | |
| | D | | | |
| | E | | | |

| Correct Answer(s) (if this is a multiple choice or multiple answer question, enter the correct letter for the answer.) | Answer | Value |
|---|---|---|
| | A | 0 |
| | B | 5 |
| | | 1 |
| | | 1 |
| | | 1 |

| expanation: | Five (5) apples are in the basket.         5 apples<br>One (1) apple drops into the basket.   5+1=6 apples<br>Two (2) apples fall out.                      6−2=4 apples |
|---|---|

| update | reset |

Fig.5G

| Quiz Num: | 13337 |
|---|---|
| Quiz Name: | How Many Apples in the Basket? |
| Enable: | No |
| Header: | This is a test to determine how many apples are left in the basket. |
| Footer: | If you scored 35, perfect!<br>If you scored more than 20, still pretty good!<br>If you scored 20 or less, not bad.<br>If you scored 15 or less, need improvement.<br>If you scored less than 15, get help, fast. |

[ Update Test ]  [ reset ]

[ Test Options ]

Click here to add a question, or click the question number to edit an existing question.

| Question# | Type | Question Statement | |
|---|---|---|---|
| 1 | Multiple Choice | Five apples are in a basket. One more apple drops into the basket and two apples fall out. How many apples are left in the basket? | Add After |
| 2 | Multiple Choice | If five apples are in a basket and one more apple drops into the basket and two apples fall out, are there five apples left in the basket? | Add After |

Fig.5H

| new question | test number:13337 |
| --- | --- |
| question type: | short answer ▽ |
| question: | Five apples are in a basket. One more apple drops into the basket and two apples fall out. How many apples are left in the basket? |
| Answer Choices (if the question type is multiple choice or multiple answer.) | Letter        Answer<br>A<br>B<br>C<br>D<br>E |
| Correct Answer(s) (if this is a multiple choice or multiple answer question, enter the correct letter for the answer.) | Answer     Value<br>four — 15<br>4 — 15<br>four apples — 15<br>4 apples — 15 |
| expanation: | Five (5) apples are in the basket.    5 apples<br>One (1) apple drops into the basket.  5+1=6 apples<br>Two (2) apples fall out.               6−2=4 apples |

| update | reset |

Fig. 5I

| Quiz Num: | 13337 |
|---|---|
| Quiz Name: | How Many Apples in the Basket? |
| Enable: | No ▽ |
| Header: | This is a test to determine how many apples are left in the basket. |
| Footer: | If you scored 35, perfect!<br>If you scored more than 20, still pretty good!<br>If you scored 20 or less, not bad.<br>If you scored 15 or less, need improvement.<br>If you scored less than 15, get help, fast. |

[ Update Test ]   [ reset ]

[ Test Options ]

Click here to add a question, or click the question number to edit an existing question.

| Question# | Type | Question Statement | |
|---|---|---|---|
| 1 | Multiple Choice | Five apples are in a basket. One more apple drops into the basket and two apples fall out. How many apples are left in the basket? | Add After |
| 2 | Multiple Choice | If five apples are in a basket and one more apple drops into the basket and two apples fall out, are there five apples left in the basket? | Add After |
| 3 | Short Answer | Five apples are in a basket. One more apple drops into the basket and two apples fall out. How many apples are left in the basket? | Add After |

Fig.5J

| new question | test number:13337 |
| --- | --- |
| question type: | multiple choice ▽ |
| question: | Five apples are in a basket. One more apple drops into the basket and two apples fall out. How many apples are left in the basket? |
| Answer Choices (if the question type is multiple choice or multiple answer.) | Letter       Answer<br>A       4<br>B       four apples<br>C       three apples<br>D       2 apples<br>E       two apples |
| Correct Answer(s) (if this is a multiple choice or multiple answer question, enter the correct letter for the answer.) | Answer       Value<br>A,B       15<br>C       5<br>D,E       1<br>       1<br>       1 |
| expanation: | Five (5) apples are in the basket.       5 apples<br>One (1) apple drops into the basket.       5+1=6 apples<br>Two (2) apples fall out.       6−2=4 apples |

| update | reset |
| --- | --- |

Fig.5K

| Quiz Num: | 13337 |
|---|---|
| Quiz Name: | How Many Apples in the Basket? |
| Enable: | No ▽ |
| Header: | This is a test to determine how many apples are left in the basket. |
| Footer: | If you scored 35, perfect!<br>If you scored more than 20, still pretty good!<br>If you scored 20 or less, not bad.<br>If you scored 15 or less, need improvement.<br>If you scored less than 15, get help, fast. |

[ Update Test ]   [ reset ]

[ Test Options ]

Click here to add a question, or click the question number to edit an existing question.

| Question# | Type | Question Statement | |
|---|---|---|---|
| 1 | Multiple Choice | Five apples are in a basket. One more apple drops into the basket and two apples fall out. How many apples are left in the basket? | Add After |
| 2 | Multiple Choice | If five apples are in a basket and one more apple drops into the basket and two apples fall out, are there five apples left in the basket? | Add After |
| 3 | Short Answer | Five apples are in a basket. One more apple drops into the basket and two apples fall out. How many apples are left in the basket? | Add After |
| 4 | Multiple Answer | Five apples are in a basket. One more apple drops into the basket and two apples fall out. How many apples are left in the basket? | Add After |

Fig.5L

| Quiz Num: | 13337 |
|---|---|
| Quiz Name: | How Many Apples in the Basket? |
| Enable: | Yes ▽ |
| Header: | This is a test to determine how many apples are left in the basket. |
| Footer: | If you scored 35, perfect!<br>If you scored more than 20, still pretty good!<br>If you scored 20 or less, not bad.<br>If you scored 15 or less, need improvement.<br>If you scored less than 15, get help, fast. |

[ Update Test ] [ reset ]

[ Test Options ]

Click here to add a question, or click the question number to edit an existing question.

| Question# | Type | Question Statement | |
|---|---|---|---|
| 1 | Multiple Choice | Five apples are in a basket. One more apple drops into the basket and two apples fall out. How many apples are left in the basket? | Add<br>After |
| 2 | Multiple Choice | If five apples are in a basket and one more apple drops into the basket and two apples fall out, are there five apples left in the basket? | Add<br>After |
| 3 | Short Answer | Five apples are in a basket. One more apple drops into the basket and two apples fall out. How many apples are left in the basket? | Add<br>After |
| 4 | Multiple Answer | Five apples are in a basket. One more apple drops into the basket and two apples fall out. How many apples are left in the basket? | Add<br>After |

Fig.5M

You can Create a new Test or view the access report of your existing tests.
To edit a test, enter the Test Number [ 13337 ] [ Edit Test ] and press the Edit Button.

Fig.6A

| Quiz Num: | 13337 |
|---|---|
| Quiz Name: | How Many Apples in the Basket? |
| Enable: | No ▽ |
| Header: | This is a test to determine how many apples are left in the basket. |
| Footer: | If you scored 35, perfect!<br>If you scored more than 20, still pretty good!<br>If you scored 20 or less, not bad.<br>If you scored 15 or less, need improvement.<br>If you scored less than 15, get help, fast. |

[ Update Test ] [ reset ]

[ Test Options ]

Click here to add a question, or click the question number to edit an existing question.

| Question# | Type | Question Statement | |
|---|---|---|---|
| 1 | Multiple Choice | Five apples are in a basket. One more apple drops into the basket and two apples fall out. How many apples are left in the basket? | Add After |
| 2 | Multiple Choice | If five apples are in a basket and one more apple drops into the basket and two apples fall out, are there five apples left in the basket? | Add After |
| 3 | Short Answer | Five apples are in a basket. One more apple drops into the basket and two apples fall out. How many apples are left in the basket? | Add After |
| 4 | Multiple Answer | Five apples are in a basket. One more apple drops into the basket and two apples fall out. How many apples are left in the basket? | Add After |

Fig.6B

| Quiz Num:  | 13337 |
| Quiz Name: | How Many Apples in the Basket? |
| Enable:    | No ▽ |
| Header:    | A test to determine how many apples are left in the basket. |
| Footer:    | If you scored 35, perfect!<br>If you scored more than 20, still pretty good!<br>If you scored 20 or less, not bad.<br>If you scored 15 or less, need improvement.<br>If you scored less than 15, get help, fast. |

[ Update Test ]  [ reset ]

[ Test Options ]

Click here to add a question, or click the question number to edit an existing question.

| Question# | Type | Question Statement | |
|---|---|---|---|
| 1 | Multiple Choice | Five apples are in a basket. One more apple drops into the basket and two apples fall out. How many apples are left in the basket? | Add After |
| 2 | Multiple Choice | If five apples are in a basket and one more apple drops into the basket and two apples fall out, are there five apples left in the basket? | Add After |
| 3 | Short Answer | Five apples are in a basket. One more apple drops into the basket and two apples fall out. How many apples are left in the basket? | Add After |
| 4 | Multiple Answer | Five apples are in a basket. One more apple drops into the basket and two apples fall out. How many apples are left in the basket? | Add After |

Fig.6C

| question number: 1 | test number:13337 |
|---|---|
| question type: | multiple choice [▽] |
| question: | Five apples are in a basket. One more apple drops into the basket and two apples fall out. How many apples are left in the basket? |
| Answer Choices (if the question type is multiple choice or multiple answer.) | Letter         Answer<br>A    6<br>B    5<br>C    4<br>D    3<br>E    2<br>F<br>G<br>H<br>I<br>J |
| Correct Answer(s) (if this is a multiple choice or multiple answer question, enter the correct letter for the answer.) | Answer        Value<br>C    15<br>B    5<br>D    5<br>A    1<br>E    1<br>     1<br>     1<br>     1<br>     1<br>     1 |
| expanation: | Five (5) apples are in the basket.      5 apples<br>One (1) apple drops into the basket.   5+1=6 apples<br>Two (2) apples fall out.               6−2=4 apples |

| update | reset | delete |

Fig.6D

| | |
|---|---|
| question number: 1 | test number:13337 |
| question type: | multiple choice ▽ |
| question: | Five apples are in a basket. One more apple drops into the basket and two apples fall out of the basket. How many apples are left in the basket? |
| Answer Choices (if the question type is multiple choice or multiple answer.) | Letter      Answer <br> A    6 <br> B    5 <br> C    4 <br> D    3 <br> E    2 <br> F <br> G <br> H <br> I <br> J |
| Correct Answer(s) (if this is a multiple choice or multiple answer question, enter the correct letter for the answer.) | Answer      Value <br> C    15 <br> B    5 <br> D    5 <br> A    1 <br> E    1 <br>    1 <br>    1 <br>    1 <br>    1 <br>    1 |
| expanation: | Five (5) apples are in the basket.      5 apples <br> One (1) apple drops into the basket.    5+1=6 apples <br> Two (2) apples fall out.      6−2=4 apples |

| update | reset | delete |

Fig.6E

| Quiz Num: | 13337 |
|---|---|
| Quiz Name: | How Many Apples in the Basket? |
| Enable: | Yes |
| Header: | A test to determine how many apples are left in the basket. |
| Footer: | If you scored 35, perfect!<br>If you scored more than 20, still pretty good!<br>If you scored 20 or less, not bad.<br>If you scored 15 or less, need improvement.<br>If you scored less than 15, get help, fast. |

[ Update Test ]  [ reset ]

[ Test Options ]

Click here to add a question, or click the question number to edit an existing question.

| Question# | Type | Question Statement | |
|---|---|---|---|
| 1 | Multiple Choice | Five apples are in a basket. One more apple drops into the basket and two apples fall out. How many apples are left in the basket? | Add After |
| 2 | Multiple Choice | If five apples are in a basket and one more apple drops into the basket and two apples fall out, are there five apples left in the basket? | Add After |
| 3 | Short Answer | Five apples are in a basket. One more apple drops into the basket and two apples fall out. How many apples are left in the basket? | Add After |
| 4 | Multiple Answer | Five apples are in a basket. One more apple drops into the basket and two apples fall out. How many apples are left in the basket? | Add After |

Fig.6F

A test to detemine how many apples are left in the basket.
This test is timed!
You have 10 minutes.

| | Click here to take this test for free |
|---|---|
| Question# | Question Statement |
| 1 | Five apples are in basket. One more apple drops into the basket and two apples fall out of the basket. How many apples are left in the basket? |
| 2 | If five apples are in a basket and one more apple drops into the basket and two apples fall out, are there five apples left in the basket? |
| 3 | Five apples are in a basket. One more apple drops into the basket and two apples fall out. How many apples are left in the basket? |
| 4 | Five apples are in a basket. One more apple drops into the basket and two apples fall out. How many apples are left in the basket? |
| | Take this test for free |

Fig.7A

Test #13337
How Many Apples in the Basket?

You have 10 minutes. Watch the status bar.

| Question# | Question Statement |
|---|---|
| 1 | Five apples are in a basket. One more apple drops into the basket and two apples fall out of the basket. How many apples are left in the basket?<br>A). ○ 6<br>B). ○ 5<br>C). ○ 4<br>D). ○ 3<br>E). ○ 2 |
| 2 | If five apples are in a basket and one more apple drops into the basket and two apples fall out, are there five apples left in the basket?<br>A). ○ True<br>B). ○ False |
| 3 | Five apples are in a basket. One more apple drops into the basket and two apples fall out. How many apples are left in the basket?<br>[          ] |
| 4 | Five apples are in a basket. One more apple drops into the basket and two apples fall out. How many apples are left in the basket?<br>A). ☐ 4<br>B). ☐ four apples<br>C). ☐ three apples<br>D). ☐ 2 apples<br>E). ☐ two apples |
|  | Score it |

Fig.7B

Test #13337
How Many Apples in the Basket?

You have 10 minutes. Watch the status bar.

| Question# | Question Statement |
|---|---|
| 1 | Five apples are in a basket. One more apple drops into the basket and two apples fall out of the basket. How many apples are left in the basket?<br><br>A). ○ 6<br>B). ○ 5<br>C). ● 4<br>D). ○ 3<br>E). ○ 2 |
| 2 | If five apples are in a basket and one more apple drops into the basket and two apples fall out, are there five apples left in the basket?<br><br>A). ○ True<br>B). ● False |
| 3 | Five apples are in a basket. One more apple drops into the basket and two apples fall out. How many apples are left in the basket?<br><br>[ 4 ] |
| 4 | Five apples are in a basket. One more apple drops into the basket and two apples fall out. How many apples are left in the basket?<br><br>A). ☐ 4<br>B). ☐ four apples<br>C). ☐ three apples<br>D). ☑ 2 apples<br>E). ☐ two apples |
| | Score it |

Fig.7C

Test #13337
How Many Apples in the Basket?

| Question# | Question Statement |
|---|---|
| 1 | *Five apples are in a basket. One more apple drops into the basket and two apples fall out of the basket. How many apples are left in the basket?*<br>You answered 4, the correct answer is 2.<br>Five (5) apples are in the basket. 5 apples One (1) apple drops into the basket. 5+1=6 apples Two (2) apples fall out. 6−2=4 apples Accordingly, the correct answer is −(C)− four apples. |
| 2 | *If five apples are in a basket and one more apple drops into the basket and two apples fall out, are there five apples left in the basket?*<br>You answered False, which is correct.<br>points=5 |
| 3 | *Five apples are in a basket. One more apple drops into the basket and two apples fall out. How many apples are left in the basket?*<br>You answered 4, which is correct.<br>points=15 |
| 4 | *Five apples are in a basket. One more apples drops into the basket and two apples fall out. How many apples are left in the basket?*<br>You answered 2 apples, the correct answer is three apples.<br>Five (5) apples are in the basket. 5 apples One (1) apples drops into the basket. 5+1=6 apples Two (2) apples fall out. 6−2=4 apples Accordingly "A" (4) and "B" (four apples) are the most correct answers. |

Score Board correct answers total:  2 (equivalent to 20 points)

wrong answers total:  2 unanswered questions:  0

If you scored 35, perfect! If you scored more than 20, still pretty good! If you scored 20 or less, not bad. If you scored 15 or less, need improvement. If you scored less than 15, get help, fast.

Fig.7D

Create a Report

From Date (mm-dd-yyyy)
| 01-13-1998 |

To Date (mm-dd-yyyy)
| 01-13-1999 |

| Click here to send |

Fig.8A

| Test.Com Report from 01-13-1998 to 01-13-1999 ||||||
|---|---|---|---|---|---|
| # | Number | Description | Credits | #Hits | Earnings |
| 1 | 13336 | cindytest | 0 | 0 | 0 |
| 1 | 13337 | How Many Apples in the Basket? | 0 | 0 | 0 |
| | | | Totals: | 0 | 0 |
| These are the most current records. ||||||

INTERNET TEST-MAKING METHOD

FIELD OF THE INVENTION

The present invention relates generally to a method of making a test and posting the test on-line for potential test-takers.

BACKGROUND AND SUMMARY OF THE INVENTION

Tests play a key role in everyday life around the world. In international business and education, a test is a standard vehicle for assessing proficiency, measuring aptitude or determining skill and knowledge. Virtually every profession requires proof of mastery through a licensing and certification test.

The present invention provides a method of making a test with images and sound files and posting the test on-line for potential test-takers. (In the context of the present application, "test" refers to any exam, assessment, survey, lesson plan, etc. comprising questions to be answered.) A host system and a plurality of remote terminals operatively coupled to the Internet are provided. Questions are input at one of the remote terminals by a test-maker. The questions are compiled into a test by the host system and then posted on-line for potential test-takers.

The step of posting the test on-line preferably includes placing the compiled test in a directory for access by potential test-takers. The directory preferably has a plurality of categories corresponding to different types of tests and the compiled test is placed in the appropriate category. For ease in administration, a just-made test is placed into a temporary category so that it may be later reviewed (by the proprietor of the host system) and placed in the most appropriate category. A test-maker is encouraged to provide input (e.g., via e-mail) as to the most appropriate category.

The test-taker may be charged for the taking of the test and, if so, it is desirable that the test-taker be able to preview the test that he/she selects from the directory. The test-maker and the proprietor of the host system preferably share the revenues generated by the test-taker taking the test. For example, the revenues could be split (i.e., 50/50).

The present invention additionally or alternatively provides a method of posting a test on-line for potential test-takers wherein the test is placed in a restricted directory. In this case, the test-taker is required to input a password to access the compiled test. The restricted directory may include tests made on-line and/or standardized tests directly input into the system. For example, the restricted directory could include academic practice tests and a school could enroll students at a set cost per school year. Alternatively, an institution could be charged based on each time a test is taken or each time the web site is visited.

These and other features of the invention are fully described and particularly pointed out in the claims. The following descriptive annexed drawings set forth in detail one illustrative embodiment, this embodiment being indicative of but one of the various ways in which the principles of the invention may be employed.

DRAWINGS

FIGS. 5A–5M are web pages used during test-making.

FIGS. 6A–6F are web pages used during test-editing.

FIGS. 7A–7D are web pages used during test-taking.

FIGS. 8A–8B are web pages used during report-generating.

DETAILED DESCRIPTION

Figure 1:
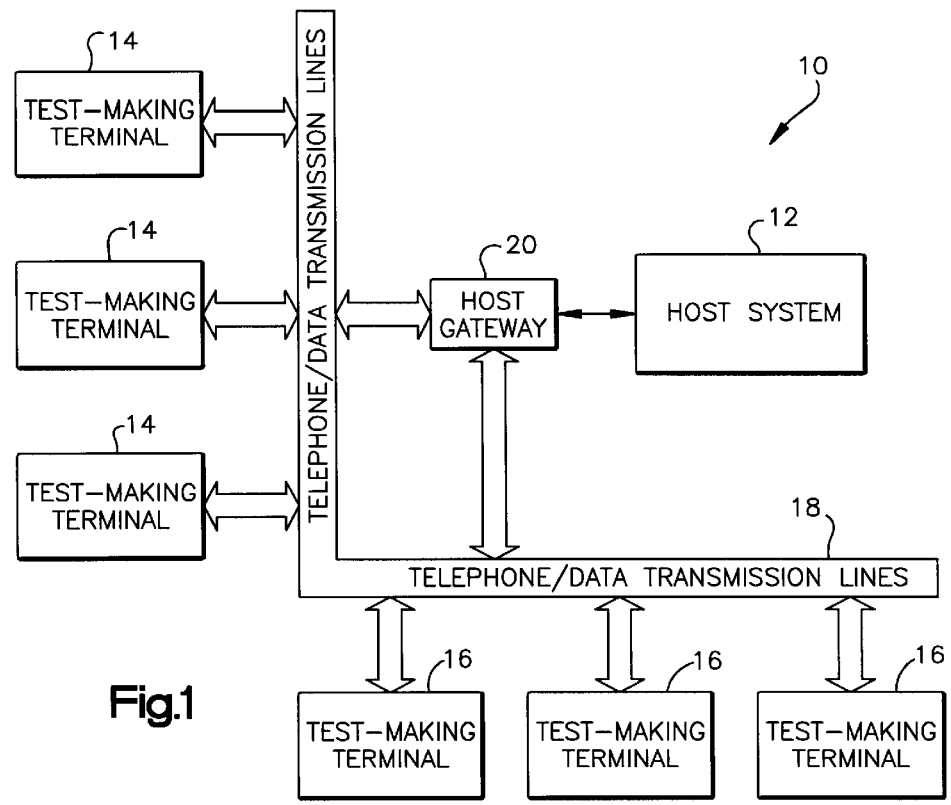
FIG. 1 is a block diagram of a system according to the present invention.

Referring now to the drawings in detail, and initially to FIG. 1, a system 10 according to the present invention is shown. In the system 10, a host system 12 exchanges data with a plurality of remote terminals 14 and 16 through data transmission across telephone and data transmission lines 18. Data transmission on the host end utilizes a host gateway 20 which interfaces the host system 12 to the network with a protocol understood by the remote terminals 14 and 16 (or intermediary equipment connected thereto). For example, on the Internet, transmission control protocol/Internet protocol (TCP/IP) typically is used.

In the illustrated system 10, there are three "test-making" terminals 14 and three "test-taking" terminals 16. This is, of course, an extremely simplified version of the present invention. In actual implementation, the system 10 would include many more terminals 14 and 16. Specifically, for example, the preferred system 10 utilizes a network such as the Internet whereby thousands and thousands of users would access the system 10. Moreover, the test-making terminals 14 may also be test-taking terminals, and/or the test-taking terminals 16 may also be test-making terminals, at different times. In any event, prospective test-makers and/or test-takers gain access over the telephone and data transmission lines 18 to the host system 12 by contacting the host gateway 20. This contact can be established on a network such as the Internet by sending data packets to an electronic address associated with the host system 12.

Figure 2:
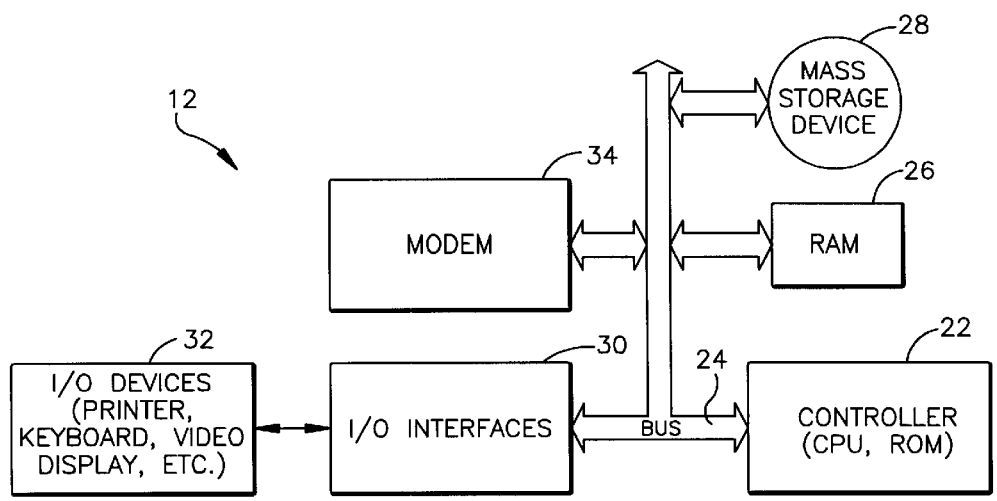
FIG. 2 is a block diagram of a host system.

Referring now to FIG. 2, the host system 12 is shown in more detail in block diagram. The host system 12 includes a controller 22 having a central processing unit (CPU) and associated read only memory (ROM). The ROM provides software instructions to perform basic operations upon power up of the system 12. Once the host system 12 receives these instructions, the CPU reads the operating system instructions stored on disk to configure the system and to permit execution of the applications programs.

The controller 22 is connected along data and address bus lines 24 to a random access memory (RAM) 26 and mass storage device 28. These components are operatively connected to input/output interface devices 30 which control various corresponding input/output devices 32. These I/O devices 32 include such conventional elements as a video display, a keyboard, a printer, and other input devices such as a mouse and a digitizer or scanner. The illustrated host system 12 includes a modem 34 to exchange information with remote terminals over standard voice lines, although devices could instead be used to transfer data between the host system 12 and the various remote terminals 14 and 16 of the system 10.

Figure 3:
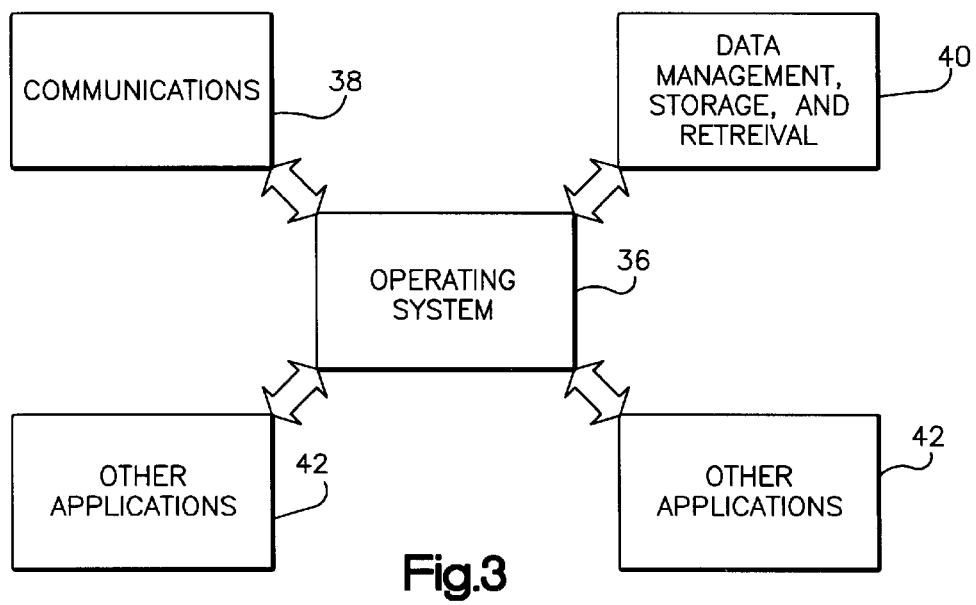
FIG. 3 is a block diagram of the software environment for one embodiment of the present invention.

Referring now to FIG. 3, the software configuration of the host system 12 is generally illustrated. The host system 12 operates under control of an operating system 36 that permits various application processes to be executed. These include a communications application 38 and a data management, storage, and retrieval application 40 (i.e., a database application). The communications application 38 permits data transfer with the remote terminals 14 and 16 whereby test-makers and test-takers may log onto the host system 12 and either make or take tests. The data base application 40 organizes the information input by test-makers and test-takers and stores this organized information in one or more mass storage devices, such as the mass storage device 28 described above. Other applications 42 may also be included in the software environment.

Figure 4:
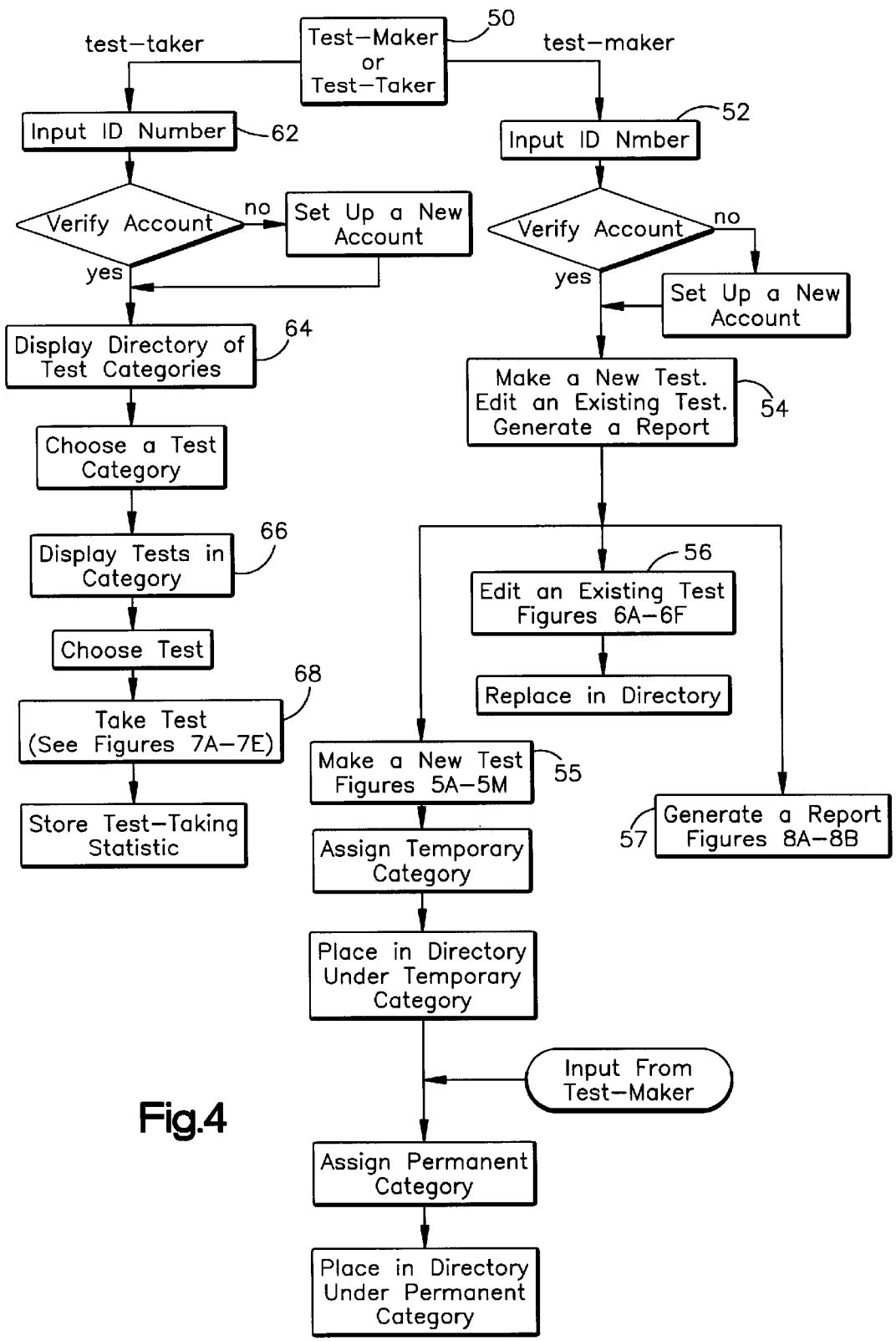
FIG. 4 is a flow chart of test-making and test-taking procedure.

Referring now to FIG. 4 a flow chart of the preferred system 10 is shown. In the preferred embodiment, the host system 12 provides a home page 50 that is accessible to both potential test-makers and test-takers. This home page 50 allows the user to cast themselves as either a test-maker or test-taker. Preferably, the program loads in images and sound files associated with the web page 50 and also the other web pages discussed below.

If the user is a test-maker, he/she is required to input an identifier, such as e-mail address, password, and/or account number, on a web page 52. The user's account is then verified and the test-maker is presented with a web page 54 whereat he/she chooses to make a new test, edit an existing test, or generate a report. If the user does not yet have an account, one is set up and the test-maker is then presented with the web page 54.

If the test-maker decides to make a new test, he/she is then presented with a series of web pages generally indicated at 55 in FIG. 4 and individually shown in detail in FIGS. 5A–5M. After making the test, it is placed in a directory for access by potential test-takers, this directory preferably including a plurality of categories such as, for example, career, civil service, creativity, current events, educators, entertainment, etc. In the preferred and illustrated embodiment, the just-made test is temporarily placed in a "slush category" until it can be reviewed in detail to determine the most appropriate category. The test-maker is encouraged to contact the proprietor of the host system 12 by e-mail, for example, to provide suggestions for the permanent category.

If the test-maker decides to edit an existing test, he/she is presented with a series of web pages illustrated schematically at 56 in FIG. 4 and as shown in detail in FIGS. 6A–6F. Once the editing is complete, the revised or edited version of the test is placed back in the directory under its permanent category.

If the test-maker decides to generate a report, he/she is presented with a series of web pages illustrated schematically at 57 in FIG. 4 and shown in detail in FIGS. 8A–8B.

As was indicated above, the home page 50 allows the user to cast himself as either a test-maker or a test-taker. If the user is a test-taker, he/she is also required to input an identifier, such as e-mail address, password, and/or account number at 62. If the identifier is recognized by the host system 12, the directory of test categories is displayed on web page 64. Otherwise, an account is set up for the user and the web page 64 is displayed.

The test-taker chooses a category and the tests contained in this category are displayed on web page 66. The test-taker then chooses a test and he/she is presented with the web pages shown schematically at 68 and shown in detail in FIGS. 7A–7E. Once the test is taken, certain data regarding the test-taker and the test are conveyed to the report storage. This data may include, for example, the identity of the test-taker, the score on the test, the time it took to complete the test, and other relevant information.

The test-maker may provide his/her test for free to potential test-takers. Alternatively, the test-maker may decide to charge a test-taker per test. To this end, the host system 12 includes a procedure for opening an account for a test-taker. For example, the home web page 50 could include an account-opening link on which the test-taker clicks to open an account. The test-taker would then be prompted to enter his/her e-mail address and to choose a password. To activate the account, a purchase link could be used to purchase electronic credits via a credit card. For example, each credit could have a value of ten cents and a user could be required to purchase at least ten dollars worth of credits (i.e., one hundred credits). As the credits are spent on tests, they are automatically deducted from the test-taker's account. Once the account is depleted, the test-taker is preferably notified.

In the preferred system 10, the credits are shared between the test-maker and the proprietor of the host system 12. For example, a fifty-fifty split of the revenues could be made between the test-maker and the host system proprietor. An account is opened for a test-maker in the same manner as described above for the test-taker (except that a purchase of credits may not be necessary). Since a user may be both a test-maker and a test-taker, a single user may both earn credits (from others taking a test that he/she made) and spend credits (by taking tests that others have made).

Referring now to FIGS. 5A–5M, the test-making web pages 55 are shown in detail. For ease in explanation, a very simplified test is used to demonstrate the principles of the invention. In actual use, tests may be much more complicated and lengthy.

The test-maker is initially provided with a web page having fields for inputting a test name, a header, and a footer. (FIG. 5A.) The test name will be used to display or identify the test in the directory. Accordingly, the test name should be descriptive and interesting, but preferably relatively short. The header is typically explanatory text and will be shown on each page of the generated test. The footer is shown when the test is scored whereby it preferably includes information or ratings corresponding to different scores. This information is then entered by clicking on the "add" icon. (FIG. 5B.) Alternatively, to start over, the test-maker may click on the "reset" icon.

The test-maker is then provided with a display including the quiz name, the header and the footer. (FIG. 5C.) At this point a test number (13337) is assigned. Also, the enable function is set at "No" to prevent the test from being posted to test-takers prior to its completion. "Test Options" may be clicked on to allow the test-maker to put in certain test-taking criteria, such as time allotted for taking the test, persons authorized to take the test, and/or cost of taking the test. Once the test number is recorded by the test-maker, and the accuracy of the quiz name, header and footer are verified, the "Update Test" icon is clicked on to update the test. The test-maker then clicks at the appropriate place ("here") to add the question.

The test-maker is then provided with a web page for inputting questions. The web page preferably identifies the test number and provides fields for entering the question type, the question statement, the answer choices, the correct answer, the value of correct answers, and an explanation. (FIG. 5D.)

The test-maker selects the question type (multiple choice is selected for question 1 in the illustrated example), inputs the question statement, inputs the answer choices, inputs the correct answer(s), assigns a value to the various possible answers, and inputs an explanation for the correct answer. (FIG. 5E.) A display is then provided which shows the test description table and lists the question number, the type of question, and the question statement for each of the questions entered so far. (FIG. 5F.)

As shown in FIGS. 5G–5L, the process is repeated as three more questions are inputted. In question number 2, the multiple choice question type is used to make a true/false question. (FIGS. 5G and 5H.) In question number 3, the short answer question type is selected and the complete answer is written out in different variations, namely, "four", "4", "four apples" and "4 apples". (FIGS. 5I and 5J.) In question number 4, a multiple answer question type is selected and input. (FIGS. 5K and 5L.) It may be noted that although in the illustrated embodiment the questions are added one after the other, the order may be changed by clicking on the "Add After" icon in an intermediate question row. Also, to edit an existing question, the test-maker may click on the question number. (FIGS. 5H, 5J, and 5L.)

Once the desired number of questions are input, the enable field is set to "YES." (FIG. 5M.) The test is then compiled and placed into the directory whereat it is available for potential test-takers.

Referring now to FIGS. 6A–6F, the test-editing web pages 62 are shown in detail. To identify the test to be edited, the test number assigned to the test (see FIG. 5C, above) is input and the "Edit Test" icon is clicked. (FIG. 6A.) The system 10 is designed so that a test can only be edited by its test-maker and the proprietor of the host system 12 if necessary.

The test-editing web page provides a display of the current name, header, footer, question number, question type, and question statement. (FIG. 6B.) The non-question portions of the test, such as the quiz name, the header and/or the footer may then be edited. For example, in the illustrated embodiment, the first few words of the header have been edited. (FIG. 6C.)

The questions may also be edited by clicking on the desired question number. For example, if "1" is clicked on, a web page will be provided displaying the particulars of the first question. (FIG. 6D.) The question type, question statement, answer choices, correct answer and/or explanation may then be updated. For example, in the illustrated embodiment, the question statement is updated to clarify that "two apples fall out of the basket." (FIG. 6E.) The "update" icon may then clicked to revise the question accordingly. A question may be deleted by clicking on the "delete" icon.

In the editing embodiment of the invention shown in FIGS. 6A–6E, the test is not enabled. In other words, the enable input is set at "No". After the editing is complete, the test may then be enabled by changing the enable input to "Yes". (FIG. 6F.) The revised test will be then replace the "unedited" version of the test in the directory.

Referring now to FIGS. 7A–7D, the test-taking web pages 68 are shown in detail. Once the test-taker selects a test from the directory, a preview of the test is provided for the test-taker. (FIG. 7A.) In the illustrated embodiment, the preview page shows the header, the question numbers and the question statements. To take the test, the test-taker clicks on the indicated icons.

The compiled test is then displayed to the test-taker. (FIG. 7B.) Each question statement is followed by either answer choices (questions 1, 2 and 4) or a space for filling in the correct answer (question 3). The test-taker inputs his/her proposed answers to the questions and then clicks on the "Score It" icon. (FIG. 7C.)

The test is then almost instantaneously scored and the test-taker is provided with the results. (FIG. 7D) Each question is followed by a statement of the test-taker's inputted answer and the correctness thereof. If the test-taker inputted answer was incorrect, the explanation is provided (questions 1 and 4). The web page also provides a score board summarizing the number of correct answers, wrong answers, unanswered questions and the points associated therewith. The footer is provided under the score board to help the test-taker interpret his performance on the test.

Referring now to FIGS. 8A and 8B, the report-making web pages 57 are shown. Once the test-maker chooses to generate a report, an initial display is provided for the entry of data. (FIG. 8A.) The report is then automatically generated by the host system 12 and displayed to the test-maker. (FIG. 8B.)

As was explained above, the compiled test is placed in a directory under a category. In the preferred system 10, the directory includes a plurality of tests from a plurality of different test-makers. Some or all of these tests may have been compiled by a test-maker in the manner described above. However, preferably, this directory will also include practice exams and tests conventionally provided in a paper or book form. For example, the directory may preferably include professional licensing and certification tests and graduate school practice tests (i.e., SAT, ACT, GMAT, LASAT, TOEFL,). Additionally or alternatively the directory may preferably include pre-employment and employment tests such as programming and operating system tests, Office Proficiency Assessment & Certification tests, personality profiling tests, civil service practice tests, real estate license practice tests, investment tests, IQ tests, self-diagnosis tests, and career guidance tests. The directory may further include more entertainment-geared tests such as puzzles, sports trivia quizzes, etc.

The tests in the directory may be available to anyone having, for example, Internet access. However, in certain settings, it may desirable, or necessary for security reasons, to limit access to certain tests. For example, a corporation may want to limit its screening tests only to potential candidates. An educational or academic institution may wish to limit its test to certain students. In such cases, a restricted directory may be developed that functions as an intranet and access thereto is limited by knowledge of a password. In this manner, the corporation or organization controls the content of its testing program and also the test-taking participants. Once a test has been taken by an authorized participant, the scores are immediately and automatically e-mailed to the administrator and/or they appear instantly online.

With a restricted directory, a corporation or organization may purchase tests, particular to its specific needs, from the general directory. Additionally, the test-making method described above may be used to make tests regarding new product and services of the company. Also, opinion polls may be conducted within an organization with or without anonymity. With particular reference to educational settings, teachers and professors often wish to create their own tests during each teaching session to ensure integrity and to accommodate changing curriculum. As such, the test-making method described above, in combination with a restricted directory, is believed to be very advantageous to the academic community. Also, various organizations may "buy" and "sell" tests as a fund-raising activity and as a way to eventually end the tedious task of grading papers. In any event, a job candidate, employee or student simply needs a computer with Internet access and the required password to take the test, or participate in surveys.

The restricted directory is preferably provided by the proprietor of the host system 12 by charging a set-up fee and a certain amount per user per period of time. For example, if a restricted directory included SAT/ACT and Advanced Placement practice courses and tests, a high school could enroll students at ten dollars per student per school year. The enrolled students could then practice as often as necessary or desired. Alternatively, the restricted directory may be provided by charging per time a user takes a test, or per time a user visits the website.

One may appreciate that although the invention has been shown and described with respect to a certain preferred embodiment, obvious and/or equivalent alterations and modifications will occur to others skilled in the art upon the reading and understanding of this specification. The present invention includes all equivalent alterations and modifications and is limited only by the scope of the following claims.

What is claimed is:

1. A method of making a test and posting the test on-line for potential test-takers, said method comprising the steps of:

providing a host system and a plurality of remote terminals operatively coupled to the Internet;

inputting questions at one of the remote terminals;

compiling the questions at the host system to make a compiled test;

posting the test on-line for potential test-takers;

wherein a test-taker is required to pay to take the compiled test; and wherein the test-maker and the proprietor of the host system share the revenues generated by the test-taker taking the test.

2. A method as set forth in claim 1 including the steps of providing a home page that is accessible to both potential test-makers and test-takers and that allows users to cast themselves as either a test-maker or a test-taker.

3. A method as set forth in claim 1 wherein the test-maker is required to input an identifier.

4. A method as set forth in claim 1 further including the steps of editing a compiled test.

5. A method as set forth in claim 1 wherein the step of posting the step includes placing the compiled test in a directory for access by potential test-takers.

6. A method as set forth in claim 5 wherein the directory has a plurality of categories corresponding to different types of tests and wherein the compiled test is placed in the appropriate category.

7. A method as set forth in claim 6 wherein the step of placing the compiled test in a directory includes the steps of placing a just-made test into a temporary category, reviewing the test to determine the appropriate category, and then placing the test into the appropriate category.

8. A method as set forth in claim 7 further comprising the step of receiving input from the test-maker as to the appropriate category.

9. A method as set forth in claim 5 wherein the test-taker chooses a test from the directory.

10. A method as set forth in claim 9 wherein the test-taker is allowed to preview the test chosen from the directory.

11. A method as set forth in claim 1 wherein the compiled test is placed in a restricted directory and the test-taker must have know a password to access the compiled test.

12. A method of posting a test on-line for potential test-takers, said method comprising the steps of:

providing a host system and a plurality of remote terminals operatively coupled to the Internet:

placing a test in a restricted directory for potential test-takers:

requiring a test-taker to input a password to have access to the restricted directory:

wherein the restricted directory includes academic practice tests and wherein a school enrolls students at a set cost per school year.

13. A system for generating and posting an on-line test, comprising:

a first computer operatively coupled to the Internet, the first computer including software means for generating the test and software means for posting the test on the Internet; and a second computer operatively coupled to the Internet, the second computer operative to allow a user to take the test and receive test results, wherein a test-taker is required to pay to take the compiled test; and wherein a test-maker and a proprietor of the first computer share the revenues generated by the test-taker taking the test.

14. A system for generating and posting an on-line test, comprising:

a host computer operatively coupled to a network backbone, the host computer including means for generating the test and means for posting the test;

a first computer operatively coupled to the host computer, the first computer being operative to generate questions for the test; and a second computer operatively coupled to the host computer, the second computer operative to the take the test, wherein a test-taker is required to pay to take the compiled test; and wherein a test-maker and a proprietor of the host computer share the revenues generated by the test-taker taking the test.

15. A system for generating and posting an on-line test, comprising:

host means, coupled to a network backbone, for generating the test and for posting the test;

means, operatively coupled to the host means, for generating questions for the test; and means, operatively coupled to the host means, for taking the test, wherein a test-taker is required to pay to take the compiled test; and wherein a test-maker and a proprietor of the host means share the revenues generated by the test-taker taking the test.

16. A method as set forth in claim 1 wherein the host system includes a procedure for opening an account for a test-taker.

* * * * *

(12) EX PARTE REEXAMINATION CERTIFICATE (8151st)
United States Patent
Anderson et al.

(10) Number: US 6,513,042 C1
(45) Certificate Issued: Apr. 12, 2011

(54) INTERNET TEST-MAKING METHOD

(75) Inventors: John C. Anderson, Cleveland, OH (US); Charles Stack, Cleveland Heights, OH (US)

(73) Assignee: Test.Com, Inc., Cleveland, OH (US)

Reexamination Request:
No. 90/007,997, Apr. 5, 2006

Reexamination Certificate for:
| | |
|---|---|
| Patent No.: | 6,513,042 |
| Issued: | Jan. 28, 2003 |
| Appl. No.: | 09/248,465 |
| Filed: | Feb. 11, 1999 |

(51) Int. Cl.
*G06F 17/30* (2006.01)

(52) U.S. Cl. .................... 707/102; 707/999.001; 707/999.01; 707/999.102; 434/322; 434/327; 434/335; 434/350; 434/362; 705/40; 705/400

(58) Field of Classification Search .................... None
See application file for complete search history.

(56) References Cited

U.S. PATENT DOCUMENTS 6,112,049 A * 8/2000 Sonnenfeld .................. 434/350

OTHER PUBLICATIONS

On Tour Media Press Release, On Tour IntraLearn Delivers First Internet–based Training and Testing Solution for Online Certification, Nov. 16, 1998.*

On Tour Media Inc., IntraLearn Web–based Certification Training and Management System, Administrator Guide, 1998.*

On Tour Media Inc., IntraLearn Web–based Certification Traning and Management System, Student Manual, 1998.*

* cited by examiner

*Primary Examiner*—Woo H. Choi

(57) ABSTRACT

A method of making a tests, assessments, surveys and lesson plans with images and sound files and posting them on-line for potential users. Questions are input by a test-maker and then the questions are compiled into a test by a host system and posted on-line for potential test-takers. The compiled test may be placed in a directory for access by the test-takers, the directory preferably having a plurality of categories corresponding to different types of tests and the compiled test is placed in the appropriate category. For ease in administration, a just-made test is placed into a temporary category so that it may be later reviewed (by the proprietor of the host system) and placed in the most appropriate category.

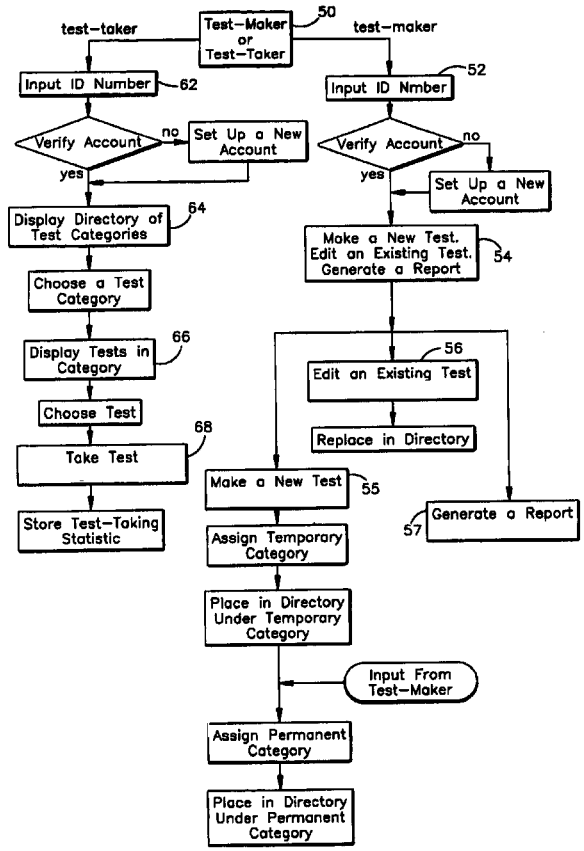

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-16 is confirmed.

New claims 17 and 18 are added and determined to be patentable.

*17. A method as set forth in claim 10 wherein the test-taker is allowed to preview an entire set of test questions that test-taker chooses from the directory.*

*18. A method as set forth in claim 13 wherein a test-taker receives the result for each question promptly after input.*

\* \* \* \* \*